US009800578B2

(12) United States Patent
Wirtanen et al.

(10) Patent No.: US 9,800,578 B2
(45) Date of Patent: Oct. 24, 2017

(54) HANDLING AUTHENTICATION FAILURES IN WIRELESS COMMUNICATION SYSTEMS

(71) Applicant: BlackBerry Limited, Waterloo (CA)

(72) Inventors: Jeffrey William Wirtanen, Ottawa (CA); Muhammad Khaledul Islam, Ottawa (CA); Jan Hendrik Lucas Bakker, Keller, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/335,124

(22) Filed: Oct. 26, 2016

(65) Prior Publication Data

US 2017/0118203 A1    Apr. 27, 2017

Related U.S. Application Data

(60) Provisional application No. 62/247,164, filed on Oct. 27, 2015.

(51) Int. Cl.
*H04M 1/66* (2006.01)
*H04M 1/68* (2006.01)
(Continued)

(52) U.S. Cl.
CPC ...... *H04L 63/0853* (2013.01); *H04L 63/0876* (2013.01); *H04W 12/06* (2013.01);
(Continued)

(58) Field of Classification Search
CPC ..... H04W 12/06; H04W 12/08; H04W 12/00; H04W 48/00; H04W 76/02; H04L 63/0892; H04L 63/08
(Continued)

(56) References Cited

U.S. PATENT DOCUMENTS

| 6,397,056 B1 * | 5/2002 | Bugnon | H04W 12/06 |
| | | | 455/411 |
| 7,574,599 B1 * | 8/2009 | Zhang | H04L 63/061 |
| | | | 713/168 |

(Continued)

FOREIGN PATENT DOCUMENTS

GB    2481395    12/2011

OTHER PUBLICATIONS

Extended European Search Report issued in European Application No. 16196089.3 dated Jan. 31, 2017.

*Primary Examiner* — Olumide T Ajibade Akonai
(74) *Attorney, Agent, or Firm* — Fish & Richardson P.C.

(57) ABSTRACT

A method for handling authentication failures in a wireless communication system includes transmitting, by a user equipment (UE) and via a first cell, a first plurality of messages including at least one of AUTHENTICATION AND CIPHERING FAILURE messages or AUTHENTICATION FAILURE messages, where two or more of the first plurality of messages indicate at least one of synch failure or medium access control (MAC) failure, and where the UE includes at least one of a subscriber identity module (SIM) or universal SIM; receiving at least one of an AUTHENTICATION REJECT message or an AUTHENTICATION AND CIPHERING REJECT message subsequent to transmitting the two or more of the first plurality of messages indicating at least one of synch failure or MAC failure; and in response to receiving the at least one of an AUTHENTICATION REJECT message or an AUTHENTICATION AND CIPHERING REJECT message, transmitting an ATTACH message via a second cell.

20 Claims, 3 Drawing Sheets

(51) Int. Cl.
*H04M 3/16* (2006.01)
*H04L 29/06* (2006.01)
*H04W 76/06* (2009.01)
*H04W 12/06* (2009.01)
*H04W 84/04* (2009.01)
*H04W 88/02* (2009.01)
*H04L 1/00* (2006.01)
*H04W 36/00* (2009.01)
*H04L 29/14* (2006.01)

(52) U.S. Cl.
CPC ............ *H04W 76/062* (2013.01); *H04L 1/00* (2013.01); *H04L 69/40* (2013.01); *H04W 36/00* (2013.01); *H04W 84/042* (2013.01); *H04W 88/02* (2013.01)

(58) Field of Classification Search
USPC .................................................. 455/410, 411
See application file for complete search history.

(56) References Cited

U.S. PATENT DOCUMENTS

| | | | |
|---|---|---|---|
| 2002/0044552 A1* | 4/2002 | Vialen | H04W 12/06 370/389 |
| 2010/0266107 A1 | 10/2010 | Brusilovsky et al. | |
| 2011/0246777 A1* | 10/2011 | Buckley | H04L 9/0844 713/172 |
| 2013/0165077 A1 | 6/2013 | Aalla et al. | |
| 2017/0006469 A1* | 1/2017 | Palanigounder | H04L 9/085 |

\* cited by examiner

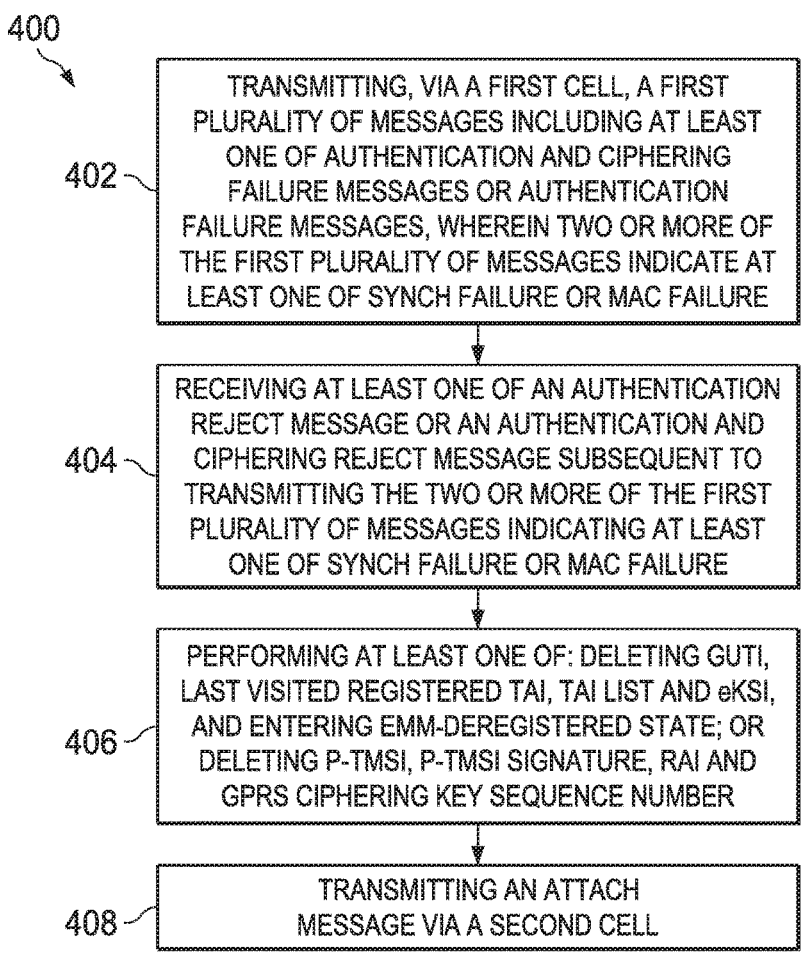
FIG. 4
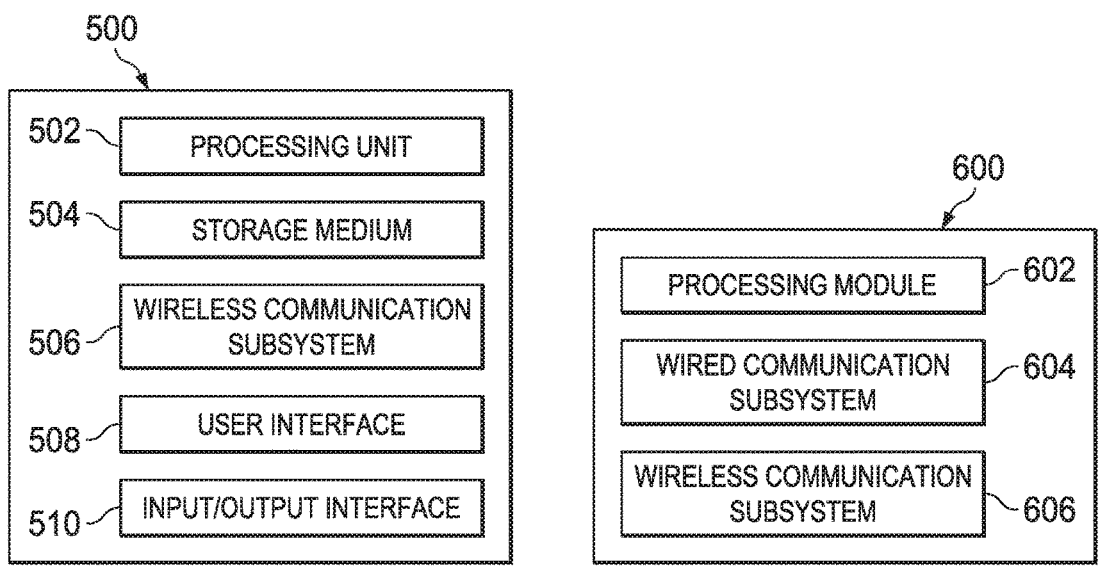
FIG. 5
FIG. 6

HANDLING AUTHENTICATION FAILURES IN WIRELESS COMMUNICATION SYSTEMS

CROSS REFERENCE TO RELATED APPLICATIONS

This application claims the benefit of priority of U.S. Application Ser. No. 62/247,164, filed on Oct. 27, 2015, which is incorporated by reference herein in its entirety.

TECHNICAL FIELD

This disclosure relates to authentication in wireless communication systems and, more specifically, to handling authentication failures.

BACKGROUND

In some cases, when a network node such as mobility management entity (MME) or serving GPRS support node (SGSN) in a wireless communication network receives two or more consecutive authentication failure messages, e.g., AUTHENTICATION AND CIPHERING FAILURE messages or AUTHENTICATION FAILURE messages, from a user equipment (UE), the network node responds with an authentication rejection message, e.g., an AUTHENTICATION AND CIPHERING REJECT message or an AUTHENTICATION REJECT message. Upon receiving the rejection message, the UE may consider itself having an invalid subscriber identity module (SIM) or universal SIM (USIM). Such a UE will not make an attempt to connect to the wireless network unless a user restarts the UE (e.g., switch off and switch on) or re-enters the SIM or USIM (e.g., remove and re-insert), causing inconvenience to the user.

DESCRIPTION OF DRAWINGS

FIG. 4 is a flowchart illustrating an example method for handling authentication failures according to some implementations.

FIG. 5 is a schematic illustrating an example user equipment apparatus according to some implementations.

FIG. 6 is a schematic illustrating an example network node according to some implementations.

Like reference numbers and designations in the various drawings indicate like elements.

DETAILED DESCRIPTION

The present disclosure is directed to handling authentication failures in wireless communication systems. In some cases, when a user equipment (UE) receives an authentication rejection message from a wireless communication network subsequent to transmitting two or more consecutive authentication failure messages, the UE does not attempt to connect to the network until a user restarts the UE or re-enters the subscriber identity module (SIM) or universal SIM (USIM), which causes inconvenience to the user. In such cases, it is desirable for the UE to automatically make an attempt to connect to the network without the user's manual intervention.

Figure 1:
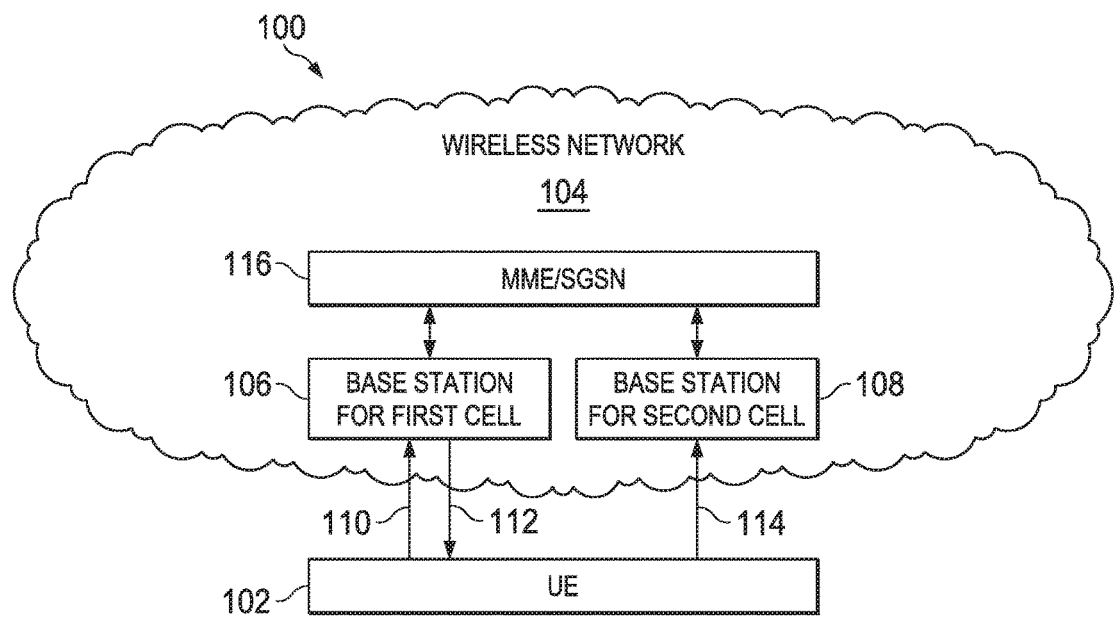
FIG. 1 is an example wireless communication system that handles authentication failures according to some implementations.

FIG. 1 is an example wireless communication system 100 that handles authentication failures according to some implementations. In some implementations, a user equipment (UE) can transmit, via a first cell, a first set of messages including two or more AUTHENTICATION AND CIPHERING FAILURE messages or two or more AUTHENTICATION FAILURE messages indicating at least one of synch failure or medium access control (MAC) failure. The UE can include at least one of a subscriber identity module (SIM) or universal SIM (USIM). The UE can receive at least one of an AUTHENTICATION REJECT message or an AUTHENTICATION AND CIPHERING REJECT message subsequent to transmitting the two or more messages indicating synch failure or MAC failure. In response to receiving the AUTHENTICATION REJECT message or the AUTHENTICATION AND CIPHERING REJECT message, the UE can transmit an ATTACH message via a second cell. The ATTACH message can be transmitted during a new attach procedure. In some cases, the first cell can be a Global System for Mobile communication (GSM) cell, and the second cell can be a Universal Terrestrial Radio Access Network (UTRAN) or Evolved UTRAN (E-UTRAN) cell. In some cases, prior to transmitting the ATTACH message, the UE can execute at least one of: deleting Globally Unique Temporary Identity (GUTI), last visited registered Tracking Area Identity (TAI), TAI List and Key Set Identifier for E-UTRAN (eKSI), and entering an EMM-DEREGISTERED state; or deleting Packet Temporary Mobile Subscriber Identity (P-TMSI), P-TMSI signature, routing area identification (RAI) and GPRS ciphering key sequence number, and entering a GMM-DEREGISTERED state.

In some implementations, the UE can transmit, via the second cell, a second set of messages including two or more AUTHENTICATION AND CIPHERING FAILURE messages or two or more AUTHENTICATION FAILURE messages indicating at least one of synch failure or MAC failure. The UE can receive at least one of an AUTHENTICATION REJECT message or an AUTHENTICATION AND CIPHERING REJECT message subsequent to transmitting the two or more messages indicating synch failure or MAC failure. Upon receiving the AUTHENTICATION REJECT message or the AUTHENTICATION AND CIPHERING REJECT message, the UE can determine at least one of a network having failed an authentication check or the USIM or SIM as invalid. When the UE determines the network having failed the authentication check, the UE can release a radio resource connection and a packet switching signaling connection, bar from accessing the second cell, and transmit an ATTACH message via a third cell. In some cases, the ATTACH message and the first set of messages or the second set of messages are transmitted to a same public land mobile network (PLMN).

In some implementations, the UE can receive, from a network, an indicator instructing the UE to execute at least one of: a detach procedure, an attach procedure, PLMN selection, or switching radio access technology (RAT). In some cases, the indicator is included in at least one of an AUTHENTICATION REJECT message or an AUTHENTICATION AND CIPHERING REJECT message.

The handling of authentication failures according to methods and systems described herein enables the UE to automatically make attempt(s) to connect to the network upon receiving an authentication rejection message subsequent to transmitting two or more consecutive authentication failure messages. The described methods and systems can reduce a user's manual intervention and improve user experience.

At a higher level, the example wireless communication system 100 includes a UE 102 and a wireless communication network 104. The wireless communication network 104 includes at least one of a mobility management entity (MME) or serving GPRS support node (SGSN) 116 connected to a base station 106 for a first cell and a base station 108 for a second cell. The UE 102 can detect or receive radio signals from both base stations 106 and 108 and can communicate with the MME/SGSN 116 via the base station 106 or 108 to perform a mutual authentication. In some implementations, a network node other than MME/SGSN can be used to perform the authentication.

In operation, when the UE 102 fails to connect or attach to the wireless network 104 via the first cell (i.e., via the base station 106 for the first cell) due to, for example, an authentication failure in an attach procedure between the UE 102 and the MME/SGSN 116, the UE 102 can automatically select a second cell and try to connect or attach to the network 104 via the second cell (i.e., via the base station 108 for the second cell). For example, upon the UE 102 receiving, via the base station 106 for the first cell, an authentication rejection message 112 from the MME/SGSN 116 subsequent to transmitting, via the base station 106 for the first cell, two or more consecutive authentication failure messages 110 to the MME/SGSN 116, the UE 102 can select a second cell for the UE 102 to attach to the network 104. The UE 102 can transmit an attach message 114, via the base station 108 for the second cell, to the MME/SGSN 116 to initiate a new attach procedure. For a better chance of successfully attaching to the network via the second cell, the UE 102 can select a second cell different than the first cell. To reduce authentication failure(s) in the new attach procedure via the second cell, prior to transmitting the attach message 114, the UE 102 can clear or delete various parameters stored at the UE 102, such as GUTI, last visited registered TAI, TAI list and eKSI. In some cases, the UE 102 can clear or delete P-TMSI, P-TMSI signature, RAI and GPRS ciphering key sequence number. In some cases, the first cell and the second cell are from a same PLMN. In some cases, the first cell and the second cell use different radio access technologies (RATs). In some implementations, after the UE 102 fails the authentication procedure via the first cell, the UE 102 can bar the first cell. For example, the UE 102 can bar the first cell for a predefined time period and the UE 102 cannot use the first cell to connect to the network 104 during the predefined time period. In some implementations, upon the MME/SGSN 116 receiving two or more consecutive authentication failure messages from the UE 102, the MME/SGSN 116 can send an indicator instructing the UE 102 to perform a procedure such as a detach, an attach, PLMN selection, or switching RAT. FIGS. 2-6 and associated descriptions provide additional details for these implementations.

Turning to a general description of the elements, a UE 102 may be referred to but is not limited to as a mobile electronic device, user device, mobile station, subscriber station, portable electronic device, mobile communications device, wireless modem, push-to-talk (PTT) dispatch console, or wireless terminal. Examples of a UE may include but are not limited to a cellular phone, personal data assistant (PDA), smart phone, PTT dispatch console, laptop, tablet personal computer (PC), pager, portable computer, portable gaming device, wearable electronic device, test equipment, gambling machine, car/vehicle, notice board, home appliance or other mobile communications device having components for communicating voice or data via a wireless communication network. The wireless communication network may include a wireless link over at least one of a licensed spectrum and an unlicensed spectrum.

Other examples of a UE include mobile and fixed electronic devices. A UE may include a Mobile Equipment (ME) device and a removable memory module, such as a Universal Integrated Circuit Card (UICC) that includes a SIM, a USIM, or a Removable User Identity Module (R-UIM). The term "UE" can also refer to any hardware or software component that can terminate a communication session for a user. In addition, the terms "user equipment," "UE," "user equipment device," "user agent," "UA," "user device," and "mobile device" can be used synonymously herein.

The wireless communication network 104 may include one or a plurality of radio access networks (RANs), other access networks such as fixed Ethernet or IEEE 802.11 WLAN, core networks (CNs), and external networks. The RANs may comprise one or more radio access technologies. In some implementations, the radio access technologies may be but are not limited to GSM, Interim Standard 95 (IS-95), Universal Mobile Telecommunications System (UMTS), CDMA2000 (Code Division Multiple Access), Evolved UMTS, Long Term Evolution (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station (e.g., the base station 106 or 108) may be a radio base station that may control all or at least some radio-related functions in a fixed part of the system. The base station may provide radio interface within their coverage area or a cell for a UE to communicate. The base station or plurality of base stations may constitute the cellular network to provide a wide area of coverage. The base station directly communicates with one or a plurality of UEs, other base stations, and one or more core network nodes.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

Figure 2:
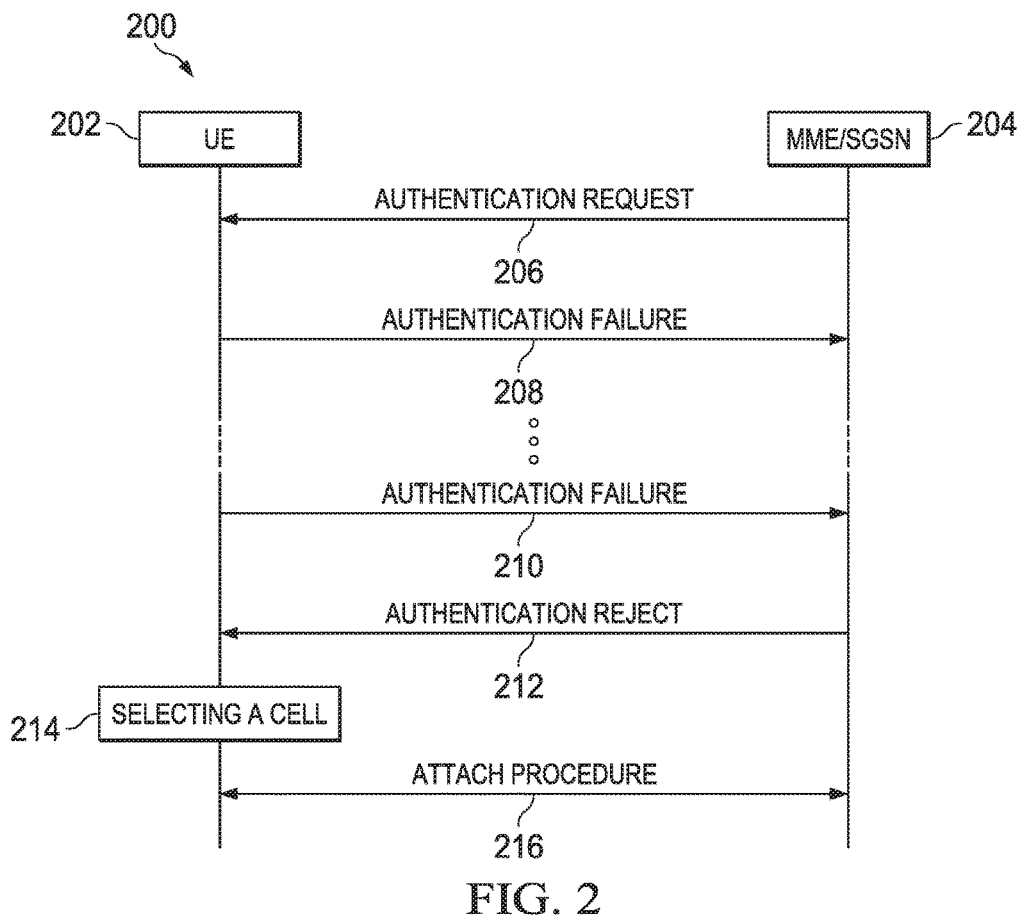
FIG. 2 is a first data flow diagram illustrating handling of authentication failures according to some implementations.

FIG. 2 is a first data flow diagram 200 illustrating handling of authentication failures according to some implementations. The data flow diagram includes a UE 202 and an MME/SGSN 204. In some implementations, various steps of the data flow diagram 200 can be run in parallel, in combination, in loops, or in any order.

At step 206, the MME/SGSN 204 can initiate an authentication procedure by sending an authentication request message, via a first cell, to the UE 202. For example, if the first cell is a GSM/UMTS cell, the authentication request message can be an AUTHENTICATION AND CIPHERING REQUEST message. If the first cell is an LTE cell, the authentication request message can be an AUTHENTICATION REQUEST message. The authentication request message can include authentication parameters that can be used by the UE 202 for authentication check. In some implementations, the authentication procedure enables the UE 202 and the MME/SGSN 204 to perform a mutual authentication and is a part of an attach procedure when the UE 102 attempts to connect to a wireless network.

At step 208, the UE 202 can transmit, via the first cell, a first authentication failure message to the MME/SGSN 204 if the authentication parameters provided in the authentication request message at step 206 do not match authentication parameters stored or generated at the UE 202. In some cases, if the first cell is a GSM/UMTS cell, the authentication failure message can be an AUTHENTICATION AND CIPHERING FAILURE message including a GPRS mobility management (GMM) cause of synch failure or medium access control (MAC) failure. If the first cell is an LTE cell, the authentication failure message can be an AUTHENTICATION FAILURE message including an Evolved Packet System (EPS) mobility management (EMM) cause of synch failure or MAC failure. For example, if a sequence number (SQN) provided by the authentication request message at step 206 is not within a range of SQNs that the UE 202 can accept, the UE 202 can send an authentication failure message including a GMM/EMM cause of synch failure and a re-synchronization token provided by the SIM/USIM. In some implementations, the authentication failure message can include a GMM/EMM cause other than synch failure and MAC failure.

Upon the MME/SGSN 204 receiving the first authentication failure message, the MME/SGSN 204 can send a new set of authentication parameters to the UE 202 for re-authentication. For example, the MME/SGSN 204 can perform a re-synchronization based on the re-synchronization token received in the first authentication failure message and obtain the new set of authentication parameters from a home location register (HLR) or some other databases. At step 210, if the new set of authentication parameters still do not match the parameters stored or generated at the UE 202, the UE 202 can transmit, via the first cell, a second authentication failure message to the MME/SGSN 204. Similar to the first authentication failure message, the second authentication failure message can be an AUTHENTICATION AND CIPHERING FAILURE message or an AUTHENTICATION FAILURE message including a GMM/EMM cause of synch failure or MAC failure.

At step 212, upon receiving two consecutive authentication failure messages, the MME/SGSN 204 can send, via the first cell, an authentication rejection message to the UE 202. For example, if the first cell is a GSM/UMTS cell, the authentication rejection message can be an AUTHENTICATION AND CIPHERING REJECT message. If the first cell is an LTE cell, the authentication rejection message can be an AUTHENTICATION REJECT message. In some implementations, the MME/SGSN 204 can send the authentication reject message after receiving more than two consecutive authentication failure messages from the UE 202.

At step 214, upon the UE 202 receiving, via the first cell, the authentication rejection message subsequent to transmitting two or more authentication failure messages indicating synch failure or MAC failure, the UE 202 can select a second cell different than the first cell for attaching to the network. For example, assuming that the UE 202 can receive or detect radio signals from multiple cells including the first cell, the UE 202 can select a second cell from the cells excluding the first cell. The second cell can be selected based on a predefined rule. For example, the UE 202 can select a cell different than the first cell that has a strongest radio signal. In some implementations, the UE 202 may randomly select a cell different than the first cell. In some cases, the second cell and the first cell can be from a same or different PLMN. The second cell and the first cell can use the same or different RAT. For example, GSM authentication is considered weaker than a UMTS authentication procedure or an authentication procedure via an E-UTRAN cell, and the UE 202 can restrict the second cell to be a UTRAN (e.g., UMTS) or E-UTRAN (e.g., LTE) cell. In some cases, the first cell can be a UTRAN cell and the second cell can be another UTRAN cell. In some cases, the UE 202 can select the second cell to be the same as the first cell if no other suitable cells are available.

At step 216, the UE 202 attempts to connect to the network using an attach procedure via the second cell. For example, the UE 202 can transmit an ATTACH message to the MME/SGSN 204 via the second cell. In some cases, the UE 202 can register its presence in a registration area of the second cell by the attach procedure. In some implementations, the attach procedure at step 216 does not use any of previously collected information such as TMSI, P-TMSI, GUTI, last visited registered TAI, TAI list and eKSI. For example, prior to performing the attach procedure at step 216, the UE 202 can clear or delete GUTI, last visited registered TAI, TAI list, and eKSI stored at the UE 202 and enter an EMM-DEREGISTERED state. In some cases, the UE 202 can clear or delete P-TMSI, P-TMSI signature, RAI and GPRS ciphering key sequence number at the UE 202 and enter a GMM-DEREGISTERED state.

In some implementations, the UE 202 can perform the following prior to executing the attach procedure at step 216:

The UE sets the EPS update status to EU2 NOT UPDATED and deletes any GUTI, last visited registered TAI, TAI List and eKSI. The UE enters the state EMM-DEREGISTERED.

If there is a circuit switched (CS) fallback emergency call pending or CS fallback call pending, or a paging for CS fallback, the UE attempts to select GSM EDGE Radio Access Network (GERAN) or UTRAN radio access technology and proceeds with the appropriate Mobility Management (MM) and Call Control (CC) specific procedures.

If there is a 1×CS fallback emergency call pending or 1×CS fallback call pending, or a paging for 1×CS fallback, the UE selects cdma2000 1× radio access technology. The UE then proceeds with appropriate cdma2000 1×CS procedures.

If there is a 1×CS fallback emergency call pending or 1×CS fallback call pending, or a paging for 1×CS fallback, and the UE has dual Rx/Tx configuration and supports enhanced 1×CS fallback, the UE performs a new attach procedure.

If there is no CS fallback emergency call pending, CS fallback call pending, 1×CS fallback emergency call pending, 1×CS fallback call pending, paging for CS fallback, or paging for 1×CS fallback and the rejected request was not for initiating a PDN connection for emergency bearer services, the UE subsequently, automatically initiate the attach procedure.

If A/Gb mode or Iu mode is supported by the UE or if the UE does not support S1 mode, the UE (in addition) handle the GMM parameters GMM state, GPRS update status, P-TMSI, P-TMSI signature, RAI and GPRS ciphering key sequence number as follows:

The MS sets the GPRS update status to GU2 NOT UPDATED, enter the state GMM-DEREGISTERED, and deletes any P-TMSI, P-TMSI signature, RAI and GPRS ciphering key sequence number.

A GPRS MS operating in MS operation mode A or B in network operation mode I which is already IMSI attached for CS services in the network, is still IMSI attached for CS services in the network.

If the rejected request was not for initiating a PDN connection for emergency bearer services, then a GPRS MS operating in MS operation mode A or B shall proceed with appropriate MM specific procedures. The MM sublayer shall act as in network operation mode II as long as the combined GMM procedures are not successful and no new RA is entered; and the MS may subsequently, automatically initiate the (GPRS) attach procedure.

A UE in CS/PS mode 1 or CS/PS mode 2 of operation which is already IMSI attached for non-EPS services is still IMSI attached for non-EPS services.

A UE in CS/PS mode 1 or CS/PS mode 2 of operation sets the update status to U2 NOT UPDATED.

In some implementations, steps 214 and 216 can be repeated. For example, if the attach procedure at step 216 fails when the UE 202 receives an authentication reject message subsequent to transmitting two or more authentication failure messages indicating synch failure or MAC failure, the UE 202 can go back to step 214 to select a third cell different than the first cell and the second cell for attaching to the network. The number of times to repeat the steps 214 and 216 can be limited. For example, after receiving the authentication rejection message more than a predefined number of times, the UE 202 can determine that the MME/SGSN 204 has failed the authentication check or the UE 202 can consider the SIM or USIM as invalid. In some cases, the third cell can be the same as the first cell or the second cell if no other suitable cells are available.

In some implementations, if the UE 202 determines that the MME/SGSN 204 has failed the authentication check, the UE 202 may request radio resource (RR) or radio resource control (RRC) to release the RR connection and the PS signaling connection, if any. In some cases, the UE 202 can bar a previous cell through which the UE 202 has tried but failed the attach procedure, and select a cell different than the previous cell to perform a new attach procedure. For example, the UE 202 can bar the previous cell for a predefined time period. In other words, the UE 202 cannot select the barred cell during the predefined time period, forcing the UE 202 to select a cell different than the barred cell for a new attach procedure.

Figure 3:
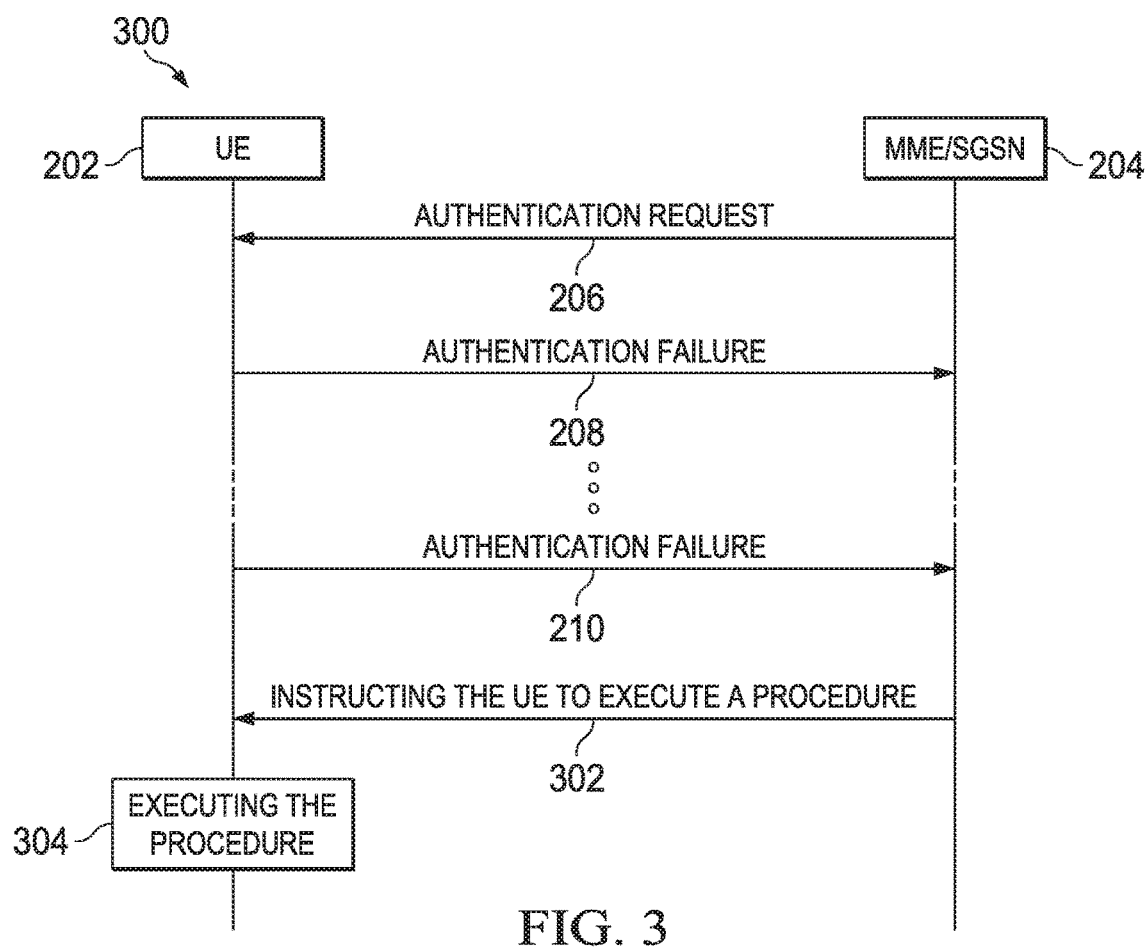
FIG. 3 is a second data flow diagram illustrating handling of authentication failures according to some implementations.

FIG. 3 is a second data flow diagram 300 illustrating handling of authentication failures according to some implementations. The data flow diagram includes a UE 202 and an MME/SGSN 204. In some implementations, various steps of the data flow diagram 300 can be run in parallel, in combination, in loops, or in any order.

Similar to the data flow diagram 200, from step 206 to 210, the MME/SGSN 204 sends an authentication request to the UE 202 and the UE 202 transmits two or more consecutive authentication failure messages. At step 302, upon the MME/SGSN 204 receiving the two or more consecutive authentication failure messages indicating synch failure or MAC failure from the UE 202, the MME/SGSN 204 can send an indicator to the UE 202 indicating one of the following:

detach the UE;
inform the UE that it needs to perform an attach procedure;
inform the UE that it needs to perform an attach procedure by rejecting the ongoing tracking area update (TAU) or routing area update (RAU) procedure that initiated the authentication procedure with cause code #9 (UE identity cannot be derived by the network);
inform the UE that it needs to perform PLMN selection; or
inform the UE that it needs to switch RATs.

In some implementations, the MME/SGSN 204 can send an AUTHENTICATION REJECT message or an AUTHENTICATION AND CIPHERING REJECT message to the UE 202 including an indicator that instructs the UE 202 to perform a detach procedure, a detach and re-attach procedure, an attach procedure, a PLMN selection, RAT switching, or other procedures.

At step 304, upon receiving the indicator from the MME/SGSN 204, the UE 202 can perform the corresponding procedure based on the indicator.

FIG. 4 is a flowchart illustrating an example method 400 for handling authentication failures according to some implementations. The method 400 starts at block 402, where a UE transmits, via a first cell, a first plurality of messages including at least one of AUTHENTICATION AND CIPHERING FAILURE messages or AUTHENTICATION FAILURE messages, to a network. The two or more of the first plurality of messages indicate at least one of synch failure or MAC failure and the UE includes at least one of a USIM or SIM. At block 404, the UE receives at least one of an AUTHENTICATION REJECT message or an AUTHENTICATION AND CIPHERING REJECT message subsequent to transmitting the two or more of the first plurality of messages indicating at least one of synch failure or MAC failure. At block 406, the UE can delete or clear parameters stored at the UE. For example, the UE can perform at least one of: deleting GUTI, last visited registered TAI, TAI List and eKSI, and entering EMM-DEREGISTERED state; or deleting P-TMSI, P-TMSI signature, RAI and GPRS ciphering key sequence number, and entering GMM-DEREGISTERED state. At block 408, the UE transmits an ATTACH message via a second cell to initiate a new attach procedure. In some implementations, the UE selects a second cell different than the first cell. In some cases, the new attach procedure does not use previously collect information because the UE has cleared the parameters stored at the UE prior to the attach procedure.

FIG. 5 is a schematic illustrating an example UE 500 apparatus according to some implementations. The example UE 500 includes a processing unit 502, a computer-readable storage medium 504 (for example, ROM or flash memory), a wireless communication subsystem 506, an interface 508, and an I/O interface 510. The processing unit 502 can include one or more processing components (alternatively referred to as "processors" or "central processing units" (CPUs)) configured to execute instructions related to one or more of the processes, steps, or actions described above in connection with one or more of the implementations disclosed herein. The processing unit 502 can also include other auxiliary components, such as random access memory (RAM) and read only memory (ROM). The computer-readable storage medium 504 can be embodied by a non-transitory medium configured to store an operating system (OS) of the device 500 and various other computer-executable software programs for performing one or more of the processes, steps, or actions described above.

The wireless communication subsystem 506 may be configured to provide wireless communications for data information or control information provided by the processing unit 502. The wireless communication subsystem 506 can include, for example, one or more antennas, a receiver, a transmitter, a local oscillator, a mixer, and a digital signal processing (DSP) unit. In some implementations, the subsystem 506 can support multiple input multiple output (MIMO) transmissions. In some implementations, the receivers in the wireless communication subsystems 506 can be an advance receiver or a baseline receiver. Two receivers can be implemented with identical, similar, or different receiver processing algorithms.

The user interface 508 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 510 can include, for example, a universal serial bus (USB) interface. A skilled artisan will readily appreciate that various other components can also be included in the example UE device 500.

FIG. 6 is a schematic illustrating an example network node 600 according to some implementations. The illustrated device 600 includes a processing module 602, a wired communication subsystem 604, and a wireless communication subsystem 606. The wireless communication subsystem 606 can receive data traffic and control traffic from the UE. In some implementations, the wireless communication subsystem 606 may include a receiver and a transmitter. The wired communication subsystem 604 can be configured to transmit and receive control information between other access node devices via backhaul connections. The processing module 602 can include one or more processing components (alternatively referred to as "processors" or "central processing units" (CPUs)) capable of executing instructions related to one or more of the processes, steps, or actions described above in connection with one or more of the implementations disclosed herein. The processing module 602 can also include other auxiliary components, such as random access memory (RAM), read only memory (ROM), secondary storage (for example, a hard disk drive, flash memory or other non-transitory storage medium). The processing module 602 can execute certain instructions and commands to provide wireless or wired communication, using the wired communication subsystem 604 or a wireless communication subsystem 606. Various other components can also be included in the device 600.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

The invention claimed is:

1. A method, comprising:
   transmitting, by a user equipment (UE) and via a first cell, a first plurality of messages including at least one of AUTHENTICATION AND CIPHERING FAILURE messages or AUTHENTICATION FAILURE messages, wherein two or more of the first plurality of messages indicate at least one of synch failure or medium access control (MAC) failure, and wherein the UE includes at least one of a subscriber identity module (SIM) or universal SIM (USIM);
   receiving at least one of an AUTHENTICATION REJECT message or an AUTHENTICATION AND CIPHERING REJECT message subsequent to transmitting the two or more of the first plurality of messages indicating at least one of synch failure or MAC failure; and
   in response to receiving the at least one of an AUTHENTICATION REJECT message or an AUTHENTICATION AND CIPHERING REJECT message, transmitting an ATTACH message via a second cell.

2. The method of claim 1, wherein the first cell is a Global System for Mobile communication (GSM) cell, and the second cell is a Universal Terrestrial Radio Access Network (UTRAN) or Evolved UTRAN (E-UTRAN) cell.

3. The method of claim 1, wherein the ATTACH message is transmitted during a new attach procedure.

4. The method of claim 1, wherein prior to transmitting the ATTACH message, executing at least one of:
   deleting Globally Unique Temporary Identity (GUTI), last visited registered Tracking Area Identity (TAI), TAI List and Key Set Identifier for E-UTRAN (eKSI), and entering an EMM-DEREGISTERED state; or
   deleting Packet Temporary Mobile Subscriber Identity (P-TMSI), P-TMSI signature, routing area identification (RAI) and GPRS ciphering key sequence number, and entering a GMM-DEREGISTERED state.

5. The method of claim 1, further comprises:
   transmitting, via the second cell, a second plurality of messages including at least one of AUTHENTICATION AND CIPHERING FAILURE messages or AUTHENTICATION FAILURE messages, wherein two or more of the second plurality of messages indicate synch failure or MAC failure;
   receiving at least one of an AUTHENTICATION REJECT message or an AUTHENTICATION AND CIPHERING REJECT message subsequent to transmitting the two or more of the second plurality of messages indicating at least one of synch failure or MAC failure; and
   determining at least one of a network having failed an authentication check or the USIM or SIM as invalid.

6. The method of claim 5, further comprising:
   when determining the network having failed the authentication check:
   releasing a radio resource connection and a packet switching signaling connection;
   barring from accessing the second cell; and
   transmitting an ATTACH message via a third cell.

7. The method of claim 5, wherein the ATTACH message and the first plurality of messages or the second plurality of messages are transmitted to a same public land mobile network (PLMN).

8. The method of claim 1, further comprising:
receiving, from a network, an indicator instructing the UE to execute at least one of: a detach procedure, an attach procedure, PLMN selection, or switching radio access technology (RAT).

9. The method of claim 8, wherein the indicator is included in at least one of an AUTHENTICATION REJECT message or an AUTHENTICATION AND CIPHERING REJECT message.

10. A device, comprising:
a memory; and
at least one hardware processor communicatively coupled with the memory and configured to:
transmit, via a first cell, a first plurality of messages including at least one of AUTHENTICATION AND CIPHERING FAILURE messages or AUTHENTICATION FAILURE messages, wherein two or more of the first plurality of messages indicate at least one of synch failure or MAC failure, and wherein the device includes at least one of a subscriber identity module (SIM) or universal SIM (USIM);
receive at least one of an AUTHENTICATION REJECT message or an AUTHENTICATION AND CIPHERING REJECT message subsequent to transmitting the two or more of the first plurality of messages indicating at least one of synch failure or medium access control (MAC) failure; and
in response to receiving the at least one of an AUTHENTICATION REJECT message or an AUTHENTICATION AND CIPHERING REJECT message, transmit an ATTACH message via a second cell.

11. The device of claim 10, wherein prior to transmitting the ATTACH message, executing at least one of:
deleting Globally Unique Temporary Identity (GUTI), last visited registered Tracking Area Identity (TAI), TAI List and Key Set Identifier for E-UTRAN (eKSI), and entering an EMM-DEREGISTERED state; or
deleting Packet Temporary Mobile Subscriber Identity (P-TMSI), P-TMSI signature, routing area identification (RAI) and GPRS ciphering key sequence number, and entering a GMM-DEREGISTERED state.

12. The device of claim 10, wherein the at least one hardware processor is further configured to:
transmit, via the second cell, a second plurality of messages including at least one of AUTHENTICATION AND CIPHERING FAILURE messages or AUTHENTICATION FAILURE messages, wherein two or more of the second plurality of messages indicate synch failure or MAC failure;
receive at least one of an AUTHENTICATION REJECT message or an AUTHENTICATION AND CIPHERING REJECT message subsequent to transmitting the two or more of the second plurality of messages indicating at least one of synch failure or MAC failure; and
determine at least one of a network having failed an authentication check or the USIM or SIM as invalid.

13. The device of claim 12, wherein the at least one hardware processor is further configured to:
when determining the network having failed the authentication check:
release a radio resource connection and a packet switching signaling connection;
bar from accessing the second cell; and
transmit an ATTACH message via a third cell.

14. The device of claim 12, wherein the ATTACH message and the first plurality of messages or the second plurality of messages are transmitted to a same public land mobile network (PLMN).

15. The device of claim 10, wherein the at least one hardware processor is further configured to:
receive, from a network, an indicator instructing the device to execute at least one of: a detach procedure, an attach procedure, PLMN selection, or switching radio access technology (RAT).

16. The device of claim 15, wherein the indicator is included in at least one of an AUTHENTICATION REJECT message or an AUTHENTICATION AND CIPHERING REJECT message.

17. A tangible, non-transitory computer-readable medium containing instructions which, when executed, cause a device to perform operations comprising:
transmitting, via a first cell, a first plurality of messages including at least one of AUTHENTICATION AND CIPHERING FAILURE messages or AUTHENTICATION FAILURE messages, wherein two or more of the first plurality of messages indicate at least one of synch failure or MAC failure, and wherein the device includes at least one of a subscriber identity module (SIM) or universal SIM (USIM);
receiving at least one of an AUTHENTICATION REJECT message or an AUTHENTICATION AND CIPHERING REJECT message subsequent to transmitting the two or more of the first plurality of messages indicating at least one of synch failure or medium access control (MAC) failure; and
in response to receiving the at least one of an AUTHENTICATION REJECT message or an AUTHENTICATION AND CIPHERING REJECT message, transmitting an ATTACH message via a second cell.

18. The tangible, non-transitory computer-readable medium of claim 17, wherein prior to transmitting the ATTACH message, the operations further comprise at least one of:
deleting Globally Unique Temporary Identity (GUTI), last visited registered Tracking Area Identity (TAI), TAI List and Key Set Identifier for E-UTRAN (eKSI), and entering an EMM-DEREGISTERED state; or
deleting Packet Temporary Mobile Subscriber Identity (P-TMSI), P-TMSI signature, routing area identification (RAI) and GPRS ciphering key sequence number, and entering a GMM-DEREGISTERED state.

19. The tangible, non-transitory computer-readable medium of claim 17, wherein the operations further comprise:
receiving, from a network, an indicator instructing the device to execute at least one of: a detach procedure, an attach procedure, PLMN selection, or switching radio access technology (RAT).

20. The tangible, non-transitory computer-readable medium of claim 17, wherein the indicator is included in at least one of an AUTHENTICATION REJECT message or an AUTHENTICATION AND CIPHERING REJECT message.

* * * * *